United States Patent
Young (10) Patent No.: US 11,512,198 B2
(45) Date of Patent: *Nov. 29, 2022

(54) POLYVINYL CHLORIDE AND COPOLYESTER COMPOSITIONS AND ARTICLES MADE USING THESE COMPOSITIONS

(71) Applicant: Eastman Chemical Company, Kingsport, TN (US)

(72) Inventor: Robert Erik Young, Kingsport, TN (US)

(73) Assignee: Eastman Chemical Company, Kingsport, TN (US)

(*) Notice: Subject to any disclaimer, the term of this patent is extended or adjusted under 35 U.S.C. 154(b) by 70 days.

This patent is subject to a terminal disclaimer.

(21) Appl. No.: 15/628,735

(22) Filed: Jun. 21, 2017

(65) Prior Publication Data

US 2018/0371233 A1  Dec. 27, 2018

(51) Int. Cl.
| | |
|---|---|
| *C08L 67/02* | (2006.01) |
| *C08L 27/06* | (2006.01) |
| *C08G 63/183* | (2006.01) |
| *C08G 63/12* | (2006.01) |
| *C08L 67/03* | (2006.01) |

(Continued)

(52) U.S. Cl.
CPC ............ *C08L 67/02* (2013.01); *C08G 63/183* (2013.01); *C08L 27/06* (2013.01); *B29C 43/24* (2013.01); *B29C 45/00* (2013.01); *B29C 48/00* (2019.02); *B29K 2027/06* (2013.01); *B29K 2067/00* (2013.01); *B29K 2067/003* (2013.01); *C08G 63/12* (2013.01); *C08G 63/123* (2013.01); *C08G 63/127* (2013.01); *C08G 63/137* (2013.01); *C08G 63/16* (2013.01); *C08G 63/18* (2013.01); *C08G 63/181* (2013.01); *C08G 63/199* (2013.01); *C08L 67/03* (2013.01);

(Continued)

(58) Field of Classification Search
None
See application file for complete search history.

(56) References Cited

U.S. PATENT DOCUMENTS

| | | |
|---|---|---|
| 2,999,835 A | 9/1961 | Goldberg |
| 3,028,365 A | 4/1962 | Schnell et al. |

(Continued)

FOREIGN PATENT DOCUMENTS

| | | | |
|---|---|---|---|
| CN | 103881260 A | * | 6/2014 |
| CN | 108 794 908 A | | 11/2018 |

(Continued)

OTHER PUBLICATIONS

"Wikipedia—Polyvinyl Chloride". (https://en.wikipedia.org/wiki/Polyvinyl_chloride) (webpage retrieved Feb. 19, 2019). (Year: 2019).*

(Continued)

*Primary Examiner* — Vivian Chen
(74) *Attorney, Agent, or Firm* — C. Stuart Everett (57) ABSTRACT

This disclosure pertains to novel polyvinyl chloride compositions containing polyvinyl chloride resins and copolyesters. More particularly, the present disclosure pertains to polyvinyl chloride compositions including high glass transition temperature (Tg) copolyesters to increase the Tg and the heat distortion temperature under load (HDTUL) of the polyvinyl chloride compositions.

19 Claims, 3 Drawing Sheets

(51) Int. Cl.

| | |
|---|---|
| *C08G 63/16* | (2006.01) |
| *C08G 63/18* | (2006.01) |
| *C08G 63/181* | (2006.01) |
| *C08G 63/127* | (2006.01) |
| *C08G 63/137* | (2006.01) |
| *C08G 63/199* | (2006.01) |
| *C08G 63/123* | (2006.01) |
| *B29C 45/00* | (2006.01) |
| *B29K 67/00* | (2006.01) |
| *B29K 27/06* | (2006.01) |
| *B29C 43/24* | (2006.01) |
| *B29C 48/00* | (2019.01) |

(52) U.S. Cl.
 CPC ....... *C08L 2203/16* (2013.01); *C08L 2203/18* (2013.01); *C08L 2205/035* (2013.01)

(56) References Cited

U.S. PATENT DOCUMENTS

| | | | |
|---|---|---|---|
| 3,153,008 A | 10/1964 | Fox | |
| 3,169,121 A | 2/1965 | Goldberg | |
| 3,334,154 A | 8/1967 | Kim | |
| 3,686,361 A * | 8/1972 | De Witt, III | C08L 27/06 524/296 |
| 3,772,405 A | 11/1973 | Hamb | |
| 3,953,394 A * | 4/1976 | Fox | C08L 67/02 524/86 |
| 3,989,672 A | 11/1976 | Vestergaard | |
| 4,001,184 A | 1/1977 | Scott | |
| 4,001,192 A * | 1/1977 | Reske | C08G 69/36 528/344 |
| 4,010,221 A * | 3/1977 | Gebhart | C08L 67/02 428/458 |
| 4,018,750 A | 4/1977 | Onizawa | |
| 4,105,624 A * | 8/1978 | Boehlke | C08L 27/06 523/219 |
| 4,123,436 A | 10/1978 | Holub et al. | |
| 4,134,575 A | 1/1979 | Chavarria | |
| 4,698,390 A | 10/1987 | Robeson et al. | |
| 4,755,699 A | 7/1988 | Schmider | |
| 4,820,763 A * | 4/1989 | Yang | C08L 67/02 524/505 |
| 5,248,546 A | 9/1993 | Greenlee | |
| 5,654,347 A | 8/1997 | Khemani et al. | |
| 5,668,243 A * | 9/1997 | Yau | C08G 63/82 528/280 |
| 5,696,176 A | 12/1997 | Khemani et al. | |
| 6,120,889 A * | 9/2000 | Turner | C08G 63/6886 428/221 |
| 6,183,848 B1 * | 2/2001 | Turner | C08F 255/02 428/221 |
| 6,632,390 B1 | 10/2003 | Shelby et al. | |
| 7,235,623 B2 | 6/2007 | Strand et al. | |
| 8,822,020 B2 | 9/2014 | Grigo et al. | |
| 10,308,799 B2 * | 6/2019 | Strand | C08G 63/183 |
| 10,584,238 B2 * | 3/2020 | Strand | C08L 67/02 |
| 11,198,781 B2 * | 12/2021 | Young | C08J 3/005 |
| 11,198,782 B2 * | 12/2021 | Young | C08G 63/199 |
| 2003/0065075 A1 * | 4/2003 | Flynn | C08J 5/18 524/394 |
| 2003/0176544 A1 * | 9/2003 | Hawrylko | C08K 3/26 524/180 |
| 2006/0100394 A1 * | 5/2006 | Hale | C08L 67/02 525/439 |
| 2007/0100122 A1 * | 5/2007 | Crawford | C08G 63/199 528/272 |
| 2007/0129531 A1 * | 6/2007 | Germroth | C08G 63/199 528/272 |
| 2007/0142511 A1 * | 6/2007 | Crawford | C08G 63/199 524/115 |
| 2007/0142615 A1 * | 6/2007 | Crawford | C08G 63/199 528/272 |
| 2008/0206535 A1 * | 8/2008 | Grigo | C08J 5/08 428/220 |
| 2008/0293882 A1 * | 11/2008 | Germroth | C08K 5/521 524/601 |
| 2009/0093573 A1 * | 4/2009 | Germroth | A01G 9/1438 524/139 |
| 2010/0159176 A1 * | 6/2010 | Hale | C08L 67/02 428/36.9 |
| 2010/0249293 A1 * | 9/2010 | Treece | C08L 67/02 524/140 |
| 2010/0298523 A1 * | 11/2010 | Germroth | C08G 63/183 528/283 |
| 2012/0141761 A1 * | 6/2012 | Deiringer | C08J 5/18 428/220 |
| 2013/0059957 A1 * | 3/2013 | Germroth | C08G 63/199 524/141 |
| 2013/0206635 A1 * | 8/2013 | Asthana | C08G 63/185 206/524.6 |
| 2013/0206636 A1 * | 8/2013 | Asthana | C08L 67/02 206/524.6 |
| 2013/0206637 A1 * | 8/2013 | Asthana | C08L 67/02 206/524.6 |
| 2013/0303692 A1 * | 11/2013 | Crawford | C08K 5/005 524/605 |
| 2014/0010982 A1 * | 1/2014 | Neill | C08L 67/02 428/36.9 |
| 2014/0051787 A1 * | 2/2014 | Kann | C08L 67/04 524/114 |
| 2015/0065637 A1 * | 3/2015 | Sugioka | C08L 69/00 524/504 |
| 2016/0108233 A1 * | 4/2016 | Kann | C08L 27/06 524/513 |
| 2016/0122471 A1 * | 5/2016 | Bae | C08L 67/02 524/310 |
| 2018/0371225 A1 * | 12/2018 | Strand | C08G 63/183 |
| 2020/0190307 A1 * | 6/2020 | Young | C08G 63/199 |
| 2020/0308388 A1 * | 10/2020 | Young | C08L 27/06 |

FOREIGN PATENT DOCUMENTS

| | | |
|---|---|---|
| DE | 10022997 A1 | 11/2001 |
| DE | 10022997 B * | 11/2001 |
| DE | 10 2005 004857 A1 | 8/2006 |
| EP | 0 118 706 A1 | 9/1984 |
| EP | 0229487 A | 7/1987 |
| EP | 0 744 439 A1 | 11/1996 |
| EP | 1 066 339 B1 | 10/2003 |
| JP | 03-086734 A * | 4/1991 |
| JP | H03 86734 A | 4/1991 |
| JP | H04 277560 A | 10/1992 |
| JP | 2001 294732 A | 10/2001 |
| JP | 2001-294732 A * | 10/2001 |
| JP | 3577614 | 10/2004 |
| WO | WO 2010 101562 | 9/2010 |
| WO | WO 2016 069673 A1 | 5/2016 |

OTHER PUBLICATIONS

Brostow, W. et al. "Prediction of Glass Transition Temperatures: Binary Blends and Copolymers". Materials Letters 62 (2008) pp. 3152-3155. (Year: 2008).*

Utracki, L.A. et al. "Glass Transition Temperature in Polymer Blends". Advances in Polymer Technology 5(1):33-39 (Mar. 1985). (Year: 1985).*

Kelsey, Donald R. et al. "High Impact, Amorphous Terephthalate Copolyesters of Rigid 2,2,4,4-Tetramethyl-1,3-cyclobutanediol with Flexible Diols." Macromolecules 2000, vol. 33, pp. 5810-5818. (Year: 2000).*

"Benefits of PVC over other materials" (https://web.archive.org/web/20160201010819/http://www.pvcconstruct.org/en/p/material) (2016) (Year: 2016).*

"What makes PVC important?" (https://web.archive.org/web/20160130102112/http://seepvcforum.com/en/content/45-what-makes-pvc-important) (2016) (Year: 2016).*

(56) References Cited

OTHER PUBLICATIONS

"Lack of Androgenicity and Estrogenicity in the three monomers used in Eastman's Tritan Copolyesters." Food and Chemical Toxicology 50 (2012) 2196-2205. (Year: 2012).*

Tritan TX2000—Technical Data Sheet (2018) (Year: 2018).*

Tritan—Drying and Processing Guildlines for Injection Molding (2013) (Year: 2013).*

Invitation to Pay Additional Fee and, Where Applicable, Protest Fee received in International Application No. PCT/US2018/036218 dated Aug. 20, 2018.

Demirel, Bilal et al., "Crystallization Behavior of PET Materials"; BAU Fen Bil. Enst. Dergisi Cilt, 13(1), 26-35, 2011.

Butschli, Jim; "Gauging demand for calendered plastics"; Packaging World, May 31, 1997; retrieved from https://www.packworld.com/article/machinery/fillingsealing/dry-filling/guaging-demand-calendered-plastics on Jun. 18, 2018; 4 pages.

Crocker, Zenas and Gupta, Ved P.; "Chapter 3 Solid Vinyl Compound Systems"; Encyclopedia of PVC, Second Edition, Revised and Expanded, vol. 3: Compounding Processes, Product Design, and Specifications; 1992; pp. 99-123.

Hanson, Ben et al.; "The Influence of Copolyester Composition on Adhesion to Soda-Lime Glass via Molecular Dynamics Simulations"; ACS Applied Materials & Interfaces, 8(21); Jun. 1, 2016, pp. 13583-13589.

Summers, James W.; "Vinyl Chloride Polymers"; Kirk-Othmer Encyclopedia of Chemical Technology, Fourth Edition, vol. 24; 1997; pp. 1017-1053.

Titow, W. V.; "Chapter 18 Calendering of PVC"; PVC Technology, Fourth Edition; 1984; pp. 803-848.

Notification of Transmittal of the International Search Report and the Written Opinion of the International Searching Authority, or the Declaration dated Jan. 25, 2019 received in International Application No. PCT/US2018/036218.

Co-pending U.S. Appl. No. 16/220,013, filed Dec. 14, 2018; Robert Erik Young et al., now U. S. Publication No. 2020-0190307.

Co-pending U.S. Appl. No. 16/946,293, filed Jun. 15, 2020; Robert Erik Young et al.

Notification of Transmittal of the International Search Report and the Written Opinion of the International Searching Authority, or the Declaration dated Mar. 2, 2020 received in International Application No. PCT/US2019/065932.

Non-Final Office Action dated Sep. 18, 2020 received in co-pending U.S. Appl. No. 16/220,013.

Non-Final Office Action dated Oct. 6, 2020 received in co-pending U.S. Appl. No. 16/946,293.

Notification of Transmittal of the International Search Report and the Written Opinion of the International Searching Authority, or the Declaration dated Sep. 23, 2021 received in International Application No. PCT/US2021/036792.

Non-Final Office Action dated Apr. 8, 2021 received in co-pending U.S. Appl. No. 16/220,013.

Notice of Allowance and Fee(s) Due dated Aug. 31, 2021 received in U.S. Appl. No. 16/220,013.

Non-Final Office Action dated Apr. 7, 2021 received in co-pending U.S. Appl. No. 16/946,293.

Notice of Allowance and Fee(s) Due dated Aug. 27, 2021 received in U.S. Appl. No. 16/946,293.

* cited by examiner

POLYVINYL CHLORIDE AND COPOLYESTER COMPOSITIONS AND ARTICLES MADE USING THESE COMPOSITIONS

FIELD

This disclosure pertains to novel polyvinyl chloride compositions. More particularly, this disclosure pertains to novel compositions containing polyvinyl chloride resins and copolyesters. More particularly, the present disclosure pertains to polyvinyl chloride compositions including high glass transition temperature (Tg) copolyesters to increase the Tg and the heat distortion temperature under load (HDTUL) of the polyvinyl chloride compositions.

BACKGROUND

Rigid Polyvinyl Chloride (PVC) formulations have been used for many years to make articles such as vinyl siding, window profiles, decking profiles, fencing and railings. These products have typically been limited to lighter colors such as white, off-white, beige or light pastel greens, blues, and yellows, but dark, intense colors are not typically offered. The reason for being limited to light colors is that these formulations can exceed the glass transition temperature (Tg) and the heat distortion temperature under load (HDTUL) of the rigid PVC formulations due to high temperatures and the absorption of the infra-red portion of the solar spectrum.

Manufacturers of these products have had to limit their design and color offerings to reduce the distortion of these products. Or they have attempted to use materials such as alpha-methyl styrene acrylonitrile copolymer (AMSAN) to increase the Tg and HDTUL of the PVC formulations. These options have drawbacks and often limit the geographical areas where these products can be used or they create processing and product deficiencies that must be addressed. For example, AMSAN results in thermal stability degradation, increased yellowing and a loss of impact properties. In the present disclosure, it has been surprisingly discovered that certain high Tg copolyester compositions are melt processable at typical rigid PVC processing temperatures with no detrimental effects to processing properties and that they increase the Tg and HDTUL with no loss of impact properties.

SUMMARY

The polyvinyl chloride compositions of the present disclosure comprise at least one polyvinyl chloride resin and at least one copolyester.

One embodiment of the present disclosure is a polyvinyl chloride composition comprising at least one polyvinyl chloride resin and at least one copolyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 60 mole % of a modifying glycol having 2 to 20 carbon atoms and
    (ii) about 40 to about 80 mole % of a second modifying glycol having 2 to 20 carbon atoms,
  wherein the total mole % of the dicarboxylic acid component is 100 mole %, and
  wherein the total mole % of the glycol component is 100 mole %.

One embodiment of the present disclosure is a polyvinyl chloride composition comprising at least one polyvinyl chloride resin and at least one copolyester which comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and
  (b) a glycol component comprising:
    (i) about 60 to about 100 mole % of a modifying glycol having 2 to 20 carbon atoms; and
    (ii) about 0 to about 40 mole % of a second modifying glycol having 2 to 20 carbon atoms;
  wherein the total mole % of the dicarboxylic acid component is 100 mole %, and
  wherein the total mole % of the glycol component is 100 mole %.

In one embodiment, the Tg of the copolyester is at least about 90° C. or higher.

In one embodiment, the Tg of the copolyester is at least about 100° C. or higher.

In one embodiment, the copolyester is amorphous.

In one embodiment, the copolyester has a crystallization half time of about 5 minutes or greater.

In one embodiment, the copolyester content in the PVC composition is about 1 to about 100 parts per hundred resin (phr) based on the PVC resin content in the composition.

In one embodiment, the polyvinyl chloride compositions are rigid.

One embodiment of the present disclosure is a method of producing a polyvinyl chloride composition comprising: extruding at least one polyvinyl chloride resin composition and at least one copolyester which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 60 mole % of a modifying having 2 to 20 carbon atoms and
    (ii) about 40 to about 80 mole % of a second modifying glycol having 2 to 20 carbon atoms, wherein the total mole % of the dicarboxylic acid component is 100 mole %, and wherein the total mole % of the glycol component is 100 mole %, to produce a viscous blend of thermoplastic material,
  introducing the blend of thermoplastic material into a calendering, extrusion or injection molding process to produce polyvinyl chloride articles.

One embodiment of the present disclosure is a method of producing a polyvinyl chloride composition comprising: extruding at least one polyvinyl chloride resin composition and at least one copolyester which comprises:
  (a) a dicarboxylic acid component comprising:
    (i) about 50 to about 100 mole % of terephthalic acid residues;
    (ii) about 0 to about 50 mole % of aromatic and/or aliphatic dicarboxylic acid residues having up to 20 carbon atoms; and (b) a glycol component comprising:
   (i) about 60 to about 100 mole % of a modifying glycol having 2 to 20 carbon atoms; and
   (ii) about 0 to about 40 mole % of a second modifying glycol having 2 to 20 carbon atoms;
wherein the total mole % of the dicarboxylic acid component is 100 mole %, and
wherein the total mole % of the glycol component is 100 mole %, to produce a viscous blend of thermoplastic material,
introducing the blend of thermoplastic material into a calendering, extrusion or injection molding process to produce polyvinyl chloride articles.

DETAILED DESCRIPTION

The polyvinyl alcohol compositions of the present disclosure comprise at least one polyvinyl chloride resin and at least one copolyester.

One embodiment of the present disclosure is a polyvinyl chloride composition comprising at least one polyvinyl chloride resin and at least one copolyester which comprises:
(a) a dicarboxylic acid component comprising:
   (i) about 90 to about 100 mole % of terephthalic acid residues;
   (ii) about 0 to about 10 mole % of aromatic and/or aliphatic dicarboxylic acid residues having up to 20 carbon atoms; and
(b) a glycol component comprising:
   (i) about 20 to about 60 mole % of a modifying glycol having 2 to 20 carbon atoms and
   (ii) about 40 to about 80 mole % of a second modifying glycol having 2 to 20 carbon atoms,
wherein the total mole % of the dicarboxylic acid component is 100 mole %, and
wherein the total mole % of the glycol component is 100 mole %.

One embodiment of the present disclosure is a polyvinyl chloride composition comprising at least one polyvinyl chloride resin and at least one copolyester which comprises:
(a) a dicarboxylic acid component comprising:
   (i) about 50 to about 100 mole % of terephthalic acid residues;
   (ii) about 0 to about 50 mole % of aromatic and/or aliphatic dicarboxylic acid residues having up to 20 carbon atoms; and
(b) a glycol component comprising:
   (i) about 60 to about 100 mole % of a modifying glycol having 2 to 20 carbon atoms; and
   (ii) about 0 to about 40 mole % of a second modifying glycol having 2 to 20 carbon atoms;
wherein the total mole % of the dicarboxylic acid component is 100 mole %, and
wherein the total mole % of the glycol component is 100 mole %.

Copolyesters

Any amorphous or essentially amorphous copolyesters are suitable for use in the present disclosure. For example, in one embodiment, any copolyesters can be used in this disclosure provided that they are essentially amorphous and have a minimum crystallization half-time of at least about 5 minutes, or at least about 7 minutes. In one embodiment, any copolyester can be used provided that its minimum crystallization half-time is at least about 8 minutes. In another embodiment, any copolyester can be used provided that its crystallization half-time is at least about 10 minutes. The amorphous copolyesters in the present disclosure can, in some embodiments, have crystallization half-times up to infinity. In one aspect of the present disclosure, blends the amorphous copolyesters with other polymers (including other polyesters and copolyesters) are suitable for use provided that the blend has a minimum crystallization half-time of at least about 5 minutes.

Crystallization half-times can be measured using a differential scanning calorimeter according to the following procedure. A sample of about 10.0 mg of the copolyester is sealed in an aluminum pan and heated at a rate of about 20° C./min to about 290° C. and held for about 2 minutes in a helium atmosphere. The sample is then cooled immediately at a rate of about 20° C./min to an isothermal crystallization temperature ranging from about 140° C. to about 200° C. with about a 10° C. interval. The crystallization half-time at each temperature is then determined as the time needed to reach the peak on the exothermic curve. The minimum crystallization half-time is the temperature at which the crystallization rate is the fastest.

In one embodiment of the present disclosure, the copolyester comprises:
(a) a dicarboxylic acid component comprising:
   (i) about 50 to about 100 mole % of terephthalic acid residues;
   (ii) about 0 to about 50 mole % of aromatic and/or aliphatic dicarboxylic acid residues having up to 20 carbon atoms; and
(b) a glycol component comprising:
   (i) about 20 to about 60 mole % of a modifying glycol having 2 to 20 carbon atoms and
   (ii) about 40 to about 80 mole % of a second modifying glycol having 2 to 20 carbon atoms,
wherein the total mole % of the dicarboxylic acid component is 100 mole %,
and wherein the total mole % of the glycol component is 100 mole %.

In another embodiment, the copolyester comprises:
(a) a dicarboxylic acid component comprising:
   (i) about 50 to about 100 mole % of terephthalic acid residues;
   (ii) about 0 to about 50 mole % of aromatic and/or aliphatic dicarboxylic acid residues having up to 20 carbon atoms; and
(b) a glycol component comprising:
   (i) about 60 to about 100 mole % of a modifying glycol having 2 to 20 carbon atoms; and
   (ii) about 0 to about 40 mole % of a second modifying glycol having 2 to 20 carbon atoms;
wherein the total mole % of the dicarboxylic acid component is 100 mole %, and
wherein the total mole % of the glycol component is 100 mole %.

Unless the context clearly suggests otherwise, the terms "polyester" and "copolyester" are used interchangeably herein. The term "polyester" is intended to include "copolyesters" and is understood to mean a synthetic polymer prepared by the polycondensation of one or more difunctional carboxylic acids (or diacids) with one or more difunctional hydroxyl compounds (or diols). In one embodiment, the difunctional carboxylic acid is a dicarboxylic acid and the difunctional hydroxyl compound is a dihydric alcohol such as, for example, glycols and diols.

The term "residue" means any organic structure incorporated into a polymer through a polycondensation reaction involving the corresponding monomer. The term "repeating unit" means an organic structure having a dicarboxylic acid residue (or diacid component) and a diol residue (or diol component) bonded through a carbonyloxy group. Thus, the dicarboxylic acid residues may be derived from a dicarboxylic acid monomer or its associated acid halides, esters, salts, anhydrides, or mixtures thereof.

In one embodiment, the copolyesters of the present disclosure are amorphous. In one embodiment, the copolyesters of the present disclosure are essentially amorphous.

In one embodiment, the copolyesters contain repeat units from a dicarboxylic acid and a diol, based on 100 mole percent of dicarboxylic acid residues and 100 mole percent of diol residues, respectively.

In one embodiment, the diacid component contains at least about 50 mole percent of the residues of an aromatic dicarboxylic acid having about 8 to about 14 carbon atoms. The copolyester may optionally be modified with up to about 50 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 60 mole percent of the residues of a diol containing 2 to 20 carbon atoms. In addition, the diol component may optionally be modified with up to about 40 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

In one embodiment, the diacid component contains at least about 90 mole percent of the residues of an aromatic dicarboxylic acid having about up to 20 carbon atoms. The copolyester may optionally be modified with up to about 10 mole percent, based on 100 mole percent of dicarboxylic acid residues, of the residues of one or more different dicarboxylic acids other than an aromatic dicarboxylic acid, such as saturated aliphatic dicarboxylic acids having 4 to 12 carbon atoms and cycloaliphatic dicarboxylic acids having 8 to 12 carbon atoms. Specific examples of dicarboxylic acids include terephthalic acid, phthalic acid, isophthalic acid, naphthalene dicarboxylic acid, 1,4-cyclohexane dicarboxylic acid, cyclohexane diacetic acid, diphenyl-4,4'-dicarboxylic acid, succinic acid, glutaric acid, adipic acid, azelaic acid, sebacic acid, and the like. The polyester may be prepared from one or more of the above dicarboxylic acids.

It should be understood that use of the corresponding acid anhydrides, esters, and acid chlorides of these acids is included in the term "dicarboxylic acid."

In one embodiment, diol component contains at least about 20 mole percent of the residues of a diol containing 2 to 20 carbon atoms. In addition, the diol component may optionally be modified with up to about 80 mole percent, based on 100 mole percent of diol residues, of the residues of one or more other diols. Specific examples of diols include ethylene glycol, diethylene glycol, triethylene glycol, isosorbide, propane-1,3-diol, butane-1,4-diol, 2,2-dimethylpropane-1,3-diol (neopentyl glycol), 2,2,4,4,-tetramethyl-1,3-cyclobutanediol, pentane-1,5-diol, hexane-1,6-diol, 1,4-cyclohexanedimethanol, 3-methyl-pentanediol-(2,4), 2-methylpentanediol-(1,4), 2,2,4-tri-methylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, and the like. The polyester may be prepared from one or more of the above diols.

The polyester may also contain small amounts of trifunctional or tetrafunctional co-monomers such as trimellitic anhydride, trimethylolpropane, pyromellitic dianhydride, pentaerythritol, and other polyester forming polyacids or polyols generally known in the art.

In one embodiment, the copolyester comprises (i) a diacid component comprising at least about 50 mole percent of residues of terephthalic acid, naphthalenedicarboxylic acid, 1,4-cyclohexanedicarboxylic acid, isophthalic acid, or mixtures thereof; and (ii) a diol component comprising at least about 80 mole percent of residues of a diol containing 2 to 10 carbon atoms. In one embodiment, the diacid component of the copolyester comprises at least about 80 mole percent of the residues of terephthalic acid, naphthalenedicarboxylic acid, 1,4-cyclohexanedicarboxylic acid, isophthalic acid, or mixtures thereof. And in one embodiment, the diol component of the copolyester comprises the residues of ethylene glycol, 1,4-cyclohexanedimethanol, diethylene glycol, neopentyl glycol, 2,2,4,4-tetramethyl-1,3-cyclobutanediol, or mixtures thereof.

In another embodiment, the copolyester comprises (i) a diacid component comprising at least about 80 mole percent of terephthalic acid residues, and (ii) a diol component comprising at least about 80 mole percent of the residues of ethylene glycol and 1,4-cyclohexanedimethanol. In yet another embodiment, the copolyester comprises (i) a diacid component comprising at least about 80 mole percent of terephthalic acid residues, and (ii) a diol component comprising at least about 80 mole percent of the residues of ethylene glycol, 1,4-cyclohexanedimethanol, and diethylene glycol. In yet another embodiment, the copolyester comprises (i) a diacid component comprising at least about 80 mole percent of terephthalic acid residues, and (ii) a diol component comprising at least about 80 mole percent of residues of ethylene glycol and neopentyl glycol. In yet another embodiment, the copolyester comprises (i) a diacid component comprising at least about 80 mole percent of terephthalic acid residues, and (ii) a diol component comprising at least about 80 mole percent of the residues of 1,4-cyclohexanedimethanol and 2,2,4,4-tetramethyl-1,3-cyclobutanediol.

Copolyesters useful in the present disclosure can have an inherent viscosity of about 0.4 to about 1.2 dL/g. As used, herein inherent viscosity (or IhV) is the viscosity of a dilute solution of the polymer, specifically IhV is the viscosity of a 60/40 (wt %/wt %) phenol/tetrachloroethane at a concentration of about 0.25 g polyester per 50 ml solution at about 25° C. or about 30° C. as determined by ASTM 4603. This viscosity measurement is representative of the polymer's molecular weight.

For example, in one embodiment, the copolyester has an inherent viscosity of about 0.45 to about 0.9 dL/g or about 0.60 to about 0.90 as measured at about 25° C. using 0.50 grams of polymer per 100 mL of a solvent consisting of 60% by weight of phenol and 40% by weight of tetrachloroethane.

In one embodiment, copolyesters useful in the present disclosure have a glass transition temperature of about 30° C. to about 140° C. For example, in one embodiment, the glass transition temperature of the copolyesters is about 90° C. to about 120° C. In another embodiment, copolyesters useful in the present disclosure have a glass transition temperature of at least about 90° C. For example, in one embodiment, the copolyesters have a glass transition temperature of at least about 100° C. and in another embodiment, the glass transition temperature about about 110° C.

The copolyester may be prepared by conventional polycondensation procedures well-known in the art. Such processes include direct condensation of the dicarboxylic acid(s) with the diol(s) or by ester interchange using a dialkyl dicarboxylate. For example, a dialkyl terephthalate such as dimethyl terephthalate is ester interchanged with the diol(s) at elevated temperatures in the presence of a catalyst. The polyesters may also be subjected to solid-state polymerization methods. Suitable methods include the steps of reacting one or more dicarboxylic acids with one or more glycols at a temperature of about 100° C. to about 315° C. at a pressure of about 0.1 to about 760 mm Hg for a time sufficient to form a polyester. See U.S. Pat. No. 3,772,405 for methods of producing polyesters, the disclosure of such methods which is incorporated herein by reference.

The copolyesters suitable for use in the present disclosure may be obtained commercially from Eastman Chemical Company.

Polyvinyl Chloride

Any polyvinyl chloride ("PVC") polymer resin is suitable for use in the present disclosure. For example, in one embodiment polyvinyl chloride polymers useful in the present disclosure include those described in the "Vinyl Chloride Polymers" entry of Kirk-Othmer Encyclopedia of Chemical Technology, Vol. 24, 4th ed., (1997) pp. 1017-1053, which is incorporated herein by reference.

In some embodiments, in the present disclosure, suitable PVC polymers include homopolymers of polyvinyl chloride resin(s), copolymers of polyvinyl chloride resin(s), and mixtures thereof.

In some embodiments, the polyvinylchloride resins are polyvinylchloride resins, chlorinated polyvinylchloride resins, or alloys thereof.

In some embodiments, copolymers of vinyl chloride are formed by the copolymerization of vinyl chloride and other monomers or monomer blends. In some embodiments, suitable monomers include vinyl acetate, ethylene, propylene, maleate, methacrylate, acrylate, high alcohol vinyl ester, urethane, chlorinated urethane, methylmethacrylate, and mixtures thereof. In some embodiments, examples of monomer blends include ethylene-vinyl acetate copolymer, acrylonitrile-butadiene-styrene terpolymer, acrylonitrile-butadiene copolymer, and mixtures thereof.

For example, in some embodiments, PVC polymers useful according to this disclosure include homopolymers of vinyl chloride and those vinyl chloride polymer resins having at least about 70 wt. % repeating units polymerized from a vinyl chloride monomer, or at least about 80 wt. %, or at least about 90 wt. %, or even about 95 wt. % or more of repeating units polymerized from a vinyl chloride monomer.

In some embodiments, the polyvinyl chloride polymer compositions of the present disclosure may comprise repeating units polymerized from a vinyl chloride monomer, and may also include comonomers up to about 30 weight percent of the copolymer from, without limitation, one or more of: the esters of acrylic acid, for example, methyl acrylate, ethyl acrylate, butyl acrylate, octyl acrylate, cyanoethyl acrylate, and the like; vinyl esters such as vinyl acetate and vinyl propionate; esters of methacrylic acid, such as methyl methacrylate, ethyl methacrylate, hydroxyethyl acrylate, butyl methacrylate, and the like; nitriles, such as acrylonitrile and methacrylonitrile; acrylamides, such as methyl acrylamide, N-methylol acrylamide, N-butoxy methacrylamide, and the like; halogen containing vinyl monomers such as vinylidene chloride vinylidene fluoride, and vinyl bromide; vinyl ethers such as ethylvinyl ether, chloroethyl vinyl ether and the like; the vinyl ketones, styrene derivatives including α-methyl styrene, vinyl toluene, chlorostyrene; vinyl naphthalene; olefins such as ethylene, butene, isobutylene, propylene and hexene; and other copolymerizable monomers or mixtures of monomers having suitable reactivity ratios with vinyl chloride as known to those skilled in the art.

In one embodiment, the copolymers can include without limitation vinyl chloride-vinyl acetate copolymers, vinyl chloride-vinylidene chloride copolymers, vinyl chloride maleate and fumarate copolymers, vinyl chloride-olefin copolymers, vinyl chloride-acrylonitrile copolymers, and the like, and combinations thereof.

Some embodiments of the present disclosure may employ PVC blends with crosslinked PVC or crosslinked PVC alone. Crosslinked PVC polymers can be made by polymerizing vinyl chloride in the presence of cross-linking monomers such as the aforementioned diallyl phthalate, trimethylol propane triacrylate, allyl methacrylate, and the like, as taught in U.S. Pat. Nos. 4,755,699 and 5,248,546, the relevant portions of which are incorporated herein by reference.

The described homopolymers and copolymers are commercially available and may be produced by any suitable polymerization method including suspension, dispersion or blending. For example, in one embodiment, polyvinyl chloride polymers prepared using suspension processes are suitable for use in the present disclosure.

In some embodiments, the PVC compositions are rigid. Any rigid PVC compositions are suitable for use in the present disclosure. For example, in some embodiments, the rigid compositions are unmodified or unplasticized or the PVC contains small amounts or no plasticizer. In some embodiments, the rigid compositions contain about 12 phr or less of plasticizers or plasticizing additives. Whereas, flexible or plasticized PVC, typically may include plasticizers at levels greater than about 12 phr. Thus, rigid PVC according to the present disclosure is characterized by a having a higher level of tensile strength than modified PVC compositions that are classified as flexible. As used herein, "parts per hundred parts resin defines the quantity of the components based on the weight of the resin and is abbreviated "phr".

Also, according to the present disclosure, rigid PVC refers to the property of a given compound having more than a certain tensile modulus. For example, PVC may be characterized as rigid when it has a tensile modulus that exceeds about 105 psi (or about 689 MPa), and semirigid when its tensile modulus falls between about 105 psi and about 3000 psi (about 20.7 MPa), and flexible when it has a tensile modulus that is less than about 3000 psi (or about 20.7 MPa) (the tensile modulus values are based on standard ASTM conditions of 23° C. and 50% relative humidity). Therefore, rigid PVC according to the present disclosure may have tensile modulus values that vary over a wide range, for example, the tensile modulus values may be from about 800 MPa to about 1000 MPa, or from about 1000 MPa up to about 2000 MPa or even up to 3000 MPa or greater.

In some the embodiments, the PVC compositions of the present disclosure are suitable for use in a variety of applications including, for example, building and construction, corner profiles, decking, fencing, railings, soffits, vinyl siding, cladding, window profiles, door frames, siding, fences, gutters, pipes, piping, appliances, electrical and electronic enclosures, electrical junction boxes, automobile interiors and exteriors, appliances, office equipment, sign enclosures, medical devices, aircraft interiors, and other high temperature applications.

In some embodiments, the polyvinyl chloride resins compositions contain additives such as processing aids, plasticizers, stabilizers, impact modifiers, biocides, flame retardants, foaming agents, blowing agents, ultraviolet light stabilizers, ultraviolet light absorbers, thermal stabilizers, minerals, pigments, dyes, colorants, fillers, fibers, waxes, fusion promoters, antioxidants, antistatic agents, release agents, lubricants, additional resins, heat distortion temperature modifiers, and possibly other additives. In some embodiments, the amount of polyvinyl chloride in the commercially available rigid polyvinyl chloride resin compositions used are typically is less than about 100%.

Any of the types of PVC resins known in the art can be useful as a component of the compositions of the disclosure. In some embodiments, the PVC resins may be in the form of a plastisol or a dry blend. Further, in some embodiments, the compositions of this disclosure can include virgin PVC, recycled PVC, such as PVC recycled from various roofing products, and combinations of virgin and recycled PVC.

In one embodiment, the PVC resins in this disclosure have inherent viscosities as determined by ASTMD1243 ranging from about 0.50 to about 1.60 dl/g, or more, for example, about 0.65 to about 1.40 dl/g, for example, about 0.83 to about 1.00 dl/g.

In one embodiment, the polyvinyl chloride resins have a Tg from about 75° C. to about 80° C. In one embodiment, the polyvinyl chloride resin has a heat deflection temperature (HDT) from about 60° C. to about 75° C.

In one aspect of the present disclosure, when the Tg of the copolyester is greater than about 90° C., the Tg of the PVC resin composition will increase and the HDT of the composition will improve.

For example, in some embodiment the polyvinyl chloride articles made using the compositions of the present disclosure have a Tg up to 110° C. or a HDT of up to 130° C. while maintaining impact strength. In some embodiments, the articles have an increase in Tg and HDT of at least 3° C. while maintaining impact strength.

In some embodiments, the ratio of PVC resin:copolyester on a weight fraction basis is greater than about 1.

In some embodiments, when the polyvinyl chloride resins and copolyesters are added at the appropriate concentrations to produce PVC compositions, and the resulting compositions have increased tensile strength and modulus as determined by ASTM D638 and increased flexural strength and modulus as determined by ASTM D790.

The copolyesters in the present disclosure are miscible in PVC. The term "miscible" refers to blends of two or more polymers that are homogenous on molecular level and behave as a single-phase mixture, exhibiting only one glass transition temperature (Tg).

The resulting PVC compositions disclosed herein can be processed on any standard PVC processing equipment, at any standard PVC processing temperatures (about 170° C. to about 230° C.), and using any standard PVC processing methods such as extrusion, injection molding, profile extrusion and sheet extrusion.

In some embodiments, the copolyesters of the present disclosure have Tg's from about 75° C. to about 120° C. In some embodiments, the copolyesters of the present disclosure have Tg's of at least about 90° C. and higher. In some embodiments, the copolyesters of the present disclosure have Tg's of at least about 100° C. and higher. In some embodiments, the copolyesters of the present disclosure have Tg's of at least about 110° C. and higher.

The copolyesters used in certain embodiments of the present disclosure, do not have distinct melting points but instead will undergo a decrease in viscosity as the processing temperatures increase past its glass transition temperature. Lower viscosity copolyesters can be obtained by using copolyesters with lower molecular weights.

In one embodiment of the present disclosure, the copolyesters have a viscosity range of about 1,000 to about 1,000,000 poise measured at about 170° C. to about 200° C. and at 10 1/s shear rate, or from about 10,000 to about 500,000 poise or from about 20,000 to about 300,000 poise. The viscosity measurements in this aspect of the invention are made by performing small amplitude oscillatory shear (SAOS) experiments using a Rheometrics RDA II rheometer and performing frequency sweeps over the range of 1 to 400 s-1 at multiple temperatures above the Tg as determined by ASTM D4440. In some embodiments, the viscosities are measure at the PVC processing temperatures of about 170° C. to about 230° C.

In one embodiment of the present disclosure, the copolyesters have crystallization half times of greater than about 5 minutes, a glass transition temperature of at least about 90° C. or higher, a viscosity range of about 1,000 to about 1,000,000 poise measured at about 170 to about 230° C. and at 10 1/s shear rate.

In another embodiment of the present disclosure, the copolyester compositions have a crystallization half time of greater than about 5 minutes and a glass transition temperature of at least 100° C. or higher and a viscosity range of about 1,000 to about 1,000,000 poise measured at about 170 to about 230° C. and at 10 1/s shear rate.

In some embodiments, the PVC resins are combined with other additives such as processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, heat distortion temperature modifiers and possibly other additives.

One embodiment of the present disclosure is a method of producing a polyvinyl chloride composition comprising: compounding a miscible admixture of at least one polyvinyl chloride resin and at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol having 2 to 20 carbon atoms; and (ii) about 40 to about 80 mole % of a second modifying glycol having 2 to 20 carbon atoms, to produce a viscous thermoplastic material, extruding the compound through a die to produce pellets; and introducing the pellets into a calendering, extrusion or injection molding process to produce polyvinyl chloride articles.

Another embodiment of the present disclosure is a method of producing a polyvinyl chloride composition comprising: compounding at least one polyvinyl chloride resin with at least one copolyester which comprises: (a) a dicarboxylic acid component comprising: (i) about 90 to about 100 mole % of terephthalic acid residues; (ii) about 0 to about 10 mole % of aromatic and/or aliphatic dicarboxylic acid residues having up to 20 carbon atoms; and (b) a glycol component comprising: (i) about 20 to about 60 mole % of a modifying glycol having 2 to 20 carbon atoms; and (ii) about 40 to about 80 mole % of a second modifying glycol having 2 to 20 carbon atoms, to produce a viscous thermoplastic material, mixing the compounded composition with a polyvinyl chloride resin to create a polyvinyl chloride composition; extruding the polyvinyl chloride composition through a die to produce pellets; and introducing the pellets into a calendering, extrusion or injection molding process to produce polyvinyl chloride articles.

In some embodiments, the PVC compositions of the present disclosure are used to make articles such as films, sheets, profiles or injection molded articles and parts.

The compositions of this disclosure are useful as molded plastic parts or as solid plastic objects. In some embodiments, the films, sheets, profiles, and injection molded articles and parts can be made using any extrusion process including extrusion processes whereby pellets are either blended together (when using concentrated ingredients) or added directly to an extruder (when using a fully compounded composition). In some embodiments, the films, profiles and sheets can be made using any calendering process.

In some embodiments, melt processing of the compositions of the present disclosure involves extrusion using any equipment known in the art including, without limitation, twin screw extruders, single screw extruders, high intensity batch mixers, Banbury mixers, Brabender mixers, roll mills, ko-kneaders or planetary gear extruder. The shear energy during the mixing is dependent on the combination of equipment, blade design, rotation speed (rpm), and mixing time. The shear energy should be sufficient to disperse the copolyesters throughout the polyvinyl chloride resins.

In some embodiments, the copolyesters, polyvinyl chloride resins and additives can be combined in any order during the process. In one embodiment, the copolyesters are premixed with the polyvinyl chloride resins. In another embodiment, the polyvinyl chloride resins are premixed with the additives and then mixed with the copolyesters.

The disclosure further relates to articles of manufacture comprising the film(s) and/or sheet(s) containing polyvinyl chloride compositions described herein. In embodiments, the films and/or sheets of the present disclosure can be of any thickness which would be apparent to one of ordinary skill in the art.

The disclosure further relates to the molded articles described herein. The methods of forming the polyvinyl chloride compositions into molded articles can include any known methods in the art. Examples of molded articles of the disclosure including but not limited to injection molded articles, and extrusion molded articles. Methods of making molded articles include but are not limited to injection molding, and extrusion.

The compositions of copolyesters and polyvinyl chloride resins of the present disclosure can be made into pellets using any standard procedure.

For example, the pellets of present disclosure can be made the following ways. In one embodiment, the copolyesters and polyvinyl chloride resins can be incorporated using a twin screw compounding line. The copolyester pellets and polyvinyl chloride resins are fed separately into the throat of the extruder and melted to produce a viscous thermoplastic material.

In one embodiment, the copolyesters and the polyvinyl chloride resins can be added using loss-in-weight feeders. The rotation of the two screws melts the copolyesters and PVC together. The mixtures are then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge is then used to separate the pellets from the water.

In one embodiment, the copolyesters and PVC can be incorporated using as a two-rotor continuous compounding mixer (such as a Farrell Continuous Mixer). The copolyesters and PVC be fed into the throat of the extruder and melted to produce a viscous thermoplastic material. The copolyesters can be pre-blended with the PVC and added to the extruder with a loss-in-weight feeder. The output rate of the mixer is controlled by varying the area of a discharge orifice. The melt can be sliced off into 'loaves' and fed to a two roll mill or the throat of a single screw extruder. In the case of the melt being fed to a two-roll mill, the melt covers one of the rolls and strip can be fed to the throat of a single screw extruder. The mixture is then extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water. In the case of the 'loaves' being fed to a single screw extruder, the mixture is extruded through a die to produce multiple strands. The strands can be fed through a water trough to cool the pellets. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

In some embodiments, the copolyesters and PVC resins can be incorporated in a plastics compounding line such as a Banbury batch type mixer. In these embodiments, the copolyesters and PVC can be fed into the Banbury-type high-intensity mixer and a ram lowered to compress the mixture into the mixing chamber. Two rotating mixer blades melt the pellets and melt the copolyester and PVC. When the desired temperature is reached, a door is opened in the bottom of the mixer and the mixture is dropped two a two roll mill. A ribbon from the two roll mill can then be fed to a single screw extruder. The mixture is then extruded through a die to produce multiple strands. The strands can be fed through a water trough to cool the strands. Upon exiting the water trough, the strands are dried and fed into a dicer to cut the strands into pellets. Alternatively, the mixture can be extruded through a circular flat plate die with multiple openings into water. The flat plate die has a rotating cutter that slices the strands as they extrude from the die to produce pellets. The continuous flow of water cools the pellets and transports them to a drying section, typically a centrifuge to separate the pellets from the water.

The present disclosure envisions several different methods to make plastic articles: extrusion to produce a continuous flat sheet or profile, injection molding to create discrete articles or extrusion to produce a continuous film or sheet.

Another embodiment of the disclosure consists of combining a copolyester and a PVC resin composition to produce a flat sheet or profile using an extrusion process. In some embodiments, this can be accomplished several ways, for example, the copolyesters and the PVC resin compositions are added separately to the throat of a single or twin screw extruder. In another embodiment, a blend of the copolyesters and the PVC resin compositions can be compounded and then added to the throat of a single or twin screw extruder. The blended mixture in some embodiments is conveyed and compressed by the screw(s) down the extruder barrel to melt the mixture and discharge the melt from the end of the extruder. The melt can then be fed through a die to create a continuous flat sheet or an into a profile die to create a continuous shape. In the embodiments using the flat sheet die, the melt is extruded onto a series of metal rolls, typically three, to cool the melt and impart a finish onto the sheet. The flat sheet is then conveyed in a continuous sheet to cool the sheet. It can then be trimmed to the desired width and then either rolled up into a roll or sheared or sawed into sheet form. A flat sheet can also be formed into a shape through mechanical means to form a desired shape and then cooled either by spraying with water, through a water trough or by blowing air on the profile. It can then be sawed or sheared to the desired length.

In embodiments using a profile die, the die is designed to produce the desired shape of the article. After exiting the die, it can then be cooled either by spraying with water, through a water trough or by blowing air on the profile. It can then be sawed or sheared to the desired length.

Another embodiment of the disclosure consists of combining an copolyester and a PVC resin composition to produce an injection molded article. This can be accomplished several ways by separately adding the copolyester, as described above, and the PVC resin to the throat of a single or twin screw extruder. In another embodiment, a blend of the copolyester the PVC composition can be pre-blended and added to the throat of a single or twin screw extruder. The blended mixture, in some embodiments, is conveyed and compressed by the screw(s) down the extruder barrel to melt the mixture and discharge the melt from the end of the extruder. When the pellets reach the desired temperature, a gate is opened at the end of the extruder and the melted plastic is pumped by the screw into a heated mold to form an article of the desired shape. After the mold is filled, a coolant is pumped through the mold to cool it and the melted plastic. After the plastic has solidified, the mold is opened and the article is removed from the mold.

For example, one embodiment of the present disclosure is a method of producing a polyvinyl chloride composition comprising: extruding at least one polyvinyl chloride resin composition and at least one copolyester, as described above, to produce a viscous blend of thermoplastic material, introducing the blend of thermoplastic material into a calendaring, extrusion or injection molding process to produce polyvinyl chloride articles.

Another embodiment of the present disclosure is a method of producing a polyvinyl chloride composition comprising: compounding a miscible admixture of at least one polyvinyl chloride resin composition and at least one copolyester, as described above, to produce a viscous thermoplastic material, extruding the compound through a die to produce pellets; and introducing the pellets into a calendering, extrusion or injection molding process to produce polyvinyl chloride articles. In some embodiments, the polyvinyl chloride compositions are rigid.

Useful applications for these PVC compositions can include many building and construction applications such as corner profiles, decking, fencing, railings, window profiles and other interior and exterior applications.

Other applications for these PVC compositions can include uses in appliances, electrical and electronic enclosures, sign enclosures, automotive applications, aircraft interiors, and other applications where rigid PVC formulations have been limited due to their lower tensile strength and modulus and flexural strength and modulus.

For example, in some embodiments, the PVC articles of this disclosure are used in the following applications: building and construction, corner profiles, decking, fencing, railings, soffits, vinyl siding, cladding, window profiles, door frames, siding, fences, gutters, pipes, piping, electrical and electronic enclosures, electrical junction boxes, automobile interiors and exteriors, appliances, office equipment, sign enclosures, medical devices, aircraft interiors, and other applications. In some embodiments, the polyvinyl chloride articles are rigid.

This disclosure can be further illustrated by the following examples, although it will be understood that these examples are included merely for purposes of illustration and are not intended to limit the scope of the disclosure unless otherwise specifically indicated.

EXAMPLES

The following tables and figures summarize experimental results of the disclosure and comparative examples:

TABLE 1

Base Rigid PVC Composition

| INGREDIENT | SUPPLIER | DESCRIPTION | |
|---|---|---|---|
| PVC Resin OXY 185F | OXY Chem | Suspension Grade PVC Resin, .67 Inherent Viscosity | 100.000 |

TABLE 1-continued

Base Rigid PVC Composition

| INGREDIENT | SUPPLIER | DESCRIPTION | |
|---|---|---|---|
| Impact Modifier Kane Ace B564 | Kaneka | Methylmethacrylate Butadiene Styrene Copolymer Core/Shell Impact Modifier | 8.000 |
| Ca/Zn Heat StabilizerNaftosafe ZP 4083 | Chemson | Proprietary Calcium/Zinc Heat Stabilizer | 2.500 |
| Acrylic Process Aid Paraloid K-125 | Dow Chemical | General Purpose, All acrylic processing aid | 3.000 |
| Calcium Carbonate Omyacarb F | OMYA | 1.4 micron median particle diameter Calcium Carbonate | 5.0 |
| External Lubricant - Stearic Acid Hystrene 5016NF | PMC Biogenix | Triple pressed Stearic Acid | 0.2 |
| Internal Lubricant - V Wax E | Strucktol | Natural non-hydrogenated wax with long chain esters and branched natural acids | 0.2 |

Table 1 summarizes the control composition—the base rigid PVC composition used in all of the examples. All data generated used this control composition with the specified additives and copolyesters were incorporated at various part per hundred resin levels based on 100 parts of PVC resin. All samples were melted and prepared using by mixing 280 grams of the compound in a Brabender Intelli-Torque mixer set at 180° C. at 40 rpm blade speed. Samples were removed from the Brabender at 180° C. and transferred to a Dr. Collin Two Roll Mill. The front roll temperature was set at 180° C. and the back roll temperature was set at 175° C. The melted material was placed on the mill, and the roll speed was set at 20 rpm. The temperature of the material was allowed to reach 175° C., and then it was removed from the mill. Films were taken off the mill at 0.010" (250 microns) and allowed to cool.

Example 1: DSC and HDT of TX2000

TABLE 2

DSC (ASTM D3418), DMA (ASTM D5026) and HDTUL (ASTM D1637)

| NOTEBOOK # (EX726-032-HDT-) | COMPOSITIONS | TG VIA DSC (° C.) | TG TAN Δ VIA DMA (° C.) | HDTUL AT 2% STRAIN VIA TENSILE DMA (° C.) |
|---|---|---|---|---|
| 001 | Control | 84 | 94.9 | 70.2 |
| 002 | 20 PHR TX2000 | 88.2 | 100.5 | 72.7 |
| 003 | 40 PHR TX2000 | 91.2 | 100.3 | 72.9 |
| 004 | 60 PHR TX2000 | 94.7 | 106.2 | 75.1 |
| 005 | 80 PHR TX2000 | 96.1 | 109 | |
| 006 | 100 PHR TX2000 | 96.8 | 110.5 | |
| 012 | 20 PHR Telalloy ™ A-15X | 91.2 | 103.3 | 73.8 |
| 013 | 40 PHR Telalloy A-15X | 96.2 | 108.3 | 77.2 |
| 014 | 60 PHR Telalloy A-15X | 100.6 | 113.2 | 80.4 |
| 015 | 80 PHR Telalloy A-15X | 101.4 | | |
| 016 | 100 PHR Telalloy A-15X | 102.9 | | |

Tritan™ TX2000 is a commercially available amorphous copolyester made by Eastman Chemical Company with a glass transition temperature of about 116° C. Telalloy™ A15-X is an alpha-Methyl Styrene Acrylonitrile (AMSAN) amorphous copolymer made by Kaneka with a glass transition temperature of about 122° C. Makrolon 2658 is a medium viscosity Polycarbonate made by Covestro with a glass transition temperature of about 145° C.

Samples were prepared adding Eastman Tritan™ TX2000 at 20, 40, 60, 80 and 100 phr. Table 2 summarizes the results for Differential Scanning calorimetry (DSC) (ASTM D3418), Dynamic Mechanical Analysis (DMA) (ASTM D5026) and Heat Distortion Temperature Under Load (HDTUL) (ASTM D1637). The data shows that the Tg as determined by DSC and DMA of all compositions containing TX2000 increases with increasing load amounts of Tritan TX2000. The Tg value as determined by DSC was taken at the midpoint of the glassy transition region and the Tg value as determined by DMA was taken at the Tan Delta Peak. The data also shows that the HDTUL as determined by tensile DMA at 2% strain increases as the Tritan TX2000 level increases.

Comparative Example 1: Telalloy™ A15-X (AMSAN) DSC and HDT

Samples were prepared using Telalloy™ A15-X at 20, 40, 60, 80 and 100 phr. Table 2 summarizes the results for Differential Scanning calorimetry (DSC) (ASTM D3418), Dynamic Mechanical Analysis (DMA) (ASTM D5026) and Heat Distortion Temperature Under Load (HDTUL) (ASTM D1637) results. The data shows that the Tg as determined by DSC and DMA of all compositions containing Telalloy A15-X increases with increasing load amounts of Telalloy A15-X. The Tg value as determined by DSC was taken at the midpoint of the glassy transition region and the Tg value as determined by DMA was taken at the Tan Delta Peak. The data also shows that the HDTUL as determined by tensile DMA at 2% strain increases as the Telalloy A15-X level increases.

Example 2: Impact Properties of TX2000 at 20 to 100 phr

TABLE 3

Instrumented Impact Results (ASTM D-3763), TX2000 and Telalloy ™ A15X

| Notebook # (EX726-032- HDT-) | Compositions | Average Max Load (kN) | Average Energy at Max Load (J) | Average Total Energy (J) | Brittle (%) |
|---|---|---|---|---|---|
| 001 | Control | 0.54 | 3.54 | 4.2 | 0 |
| 002 | 20 PHR TX2000 | 0.57 | 3.84 | 4.53 | 0 |
| 003 | 40 PHR TX2000 | 0.51 | 3.18 | 3.76 | 20 |
| 004 | 60 PHR TX2000 | 0.52 | 3.11 | 3.86 | 0 |
| 005 | 80 PHR TX2000 | 0.45 | 2.99 | 3.3 | 0 |
| 006 | 100 PHR TX2000 | 0.48 | 2.96 | 3.49 | 0 |
| 012 | 20 PHR Telalloy ™ A-15X | 0.57 | 3.56 | 4.37 | 20 |
| 013 | 40 PHR Telalloy A-15X | 0.5 | 2.66 | 2.98 | 100 |
| 014 | 60 PHR Telalloy A-15X | 0.36 | 1.48 | 1.53 | 100 |

Samples were prepared using Eastman Tritan™ TX2000 at 20, 40, 60, 80 and 100 phr. Table 3 summarizes the Instrumented Impact (ASTM D 3763) results. The data shows that all compositions containing TX2000 are ductile and maintained high average energy.

Comparative Example 2: Impact Properties of Telalloy™ A15-X at 20 to 60 phr

Samples were prepared using Telalloy™ A15-X at 20, 40 and 60 phr. Table 3 summarizes the Instrumented Impact (ASTM D 3763) results. The data shows that compositions containing the Telalloy A15-X were mostly brittle and decreased in average impact energy as the Telalloy A15-X level increased.

direction the films were pulled off the mill (transverse direction). All of the samples containing Tritan TX2000 maintained tensile stress and strain values at yield and tensile stress and strain values at break.

Comparative Example 4: Tensile Properties of Telalloy™ A15-X at 20 to 60 phr

Samples were prepared using Telalloy™ A15-X at 20, 40 and 60 phr. Table 4 summarizes the Tensile Property data (ASTM D-638). Measurements were performed in the direction the films were pulled of the two roll mil (machine direction) and perpendicular to the direction the films were pulled off the mill (transverse direction). Samples containing Telalloy A15-X became more brittle as exhibited by decreased % elongation at break in both the machine and transverse directions as the level of Telalloy A15-X increased.

Example 4: Processing Properties of TX2000—Viscosity Sweeps

Figure 1:
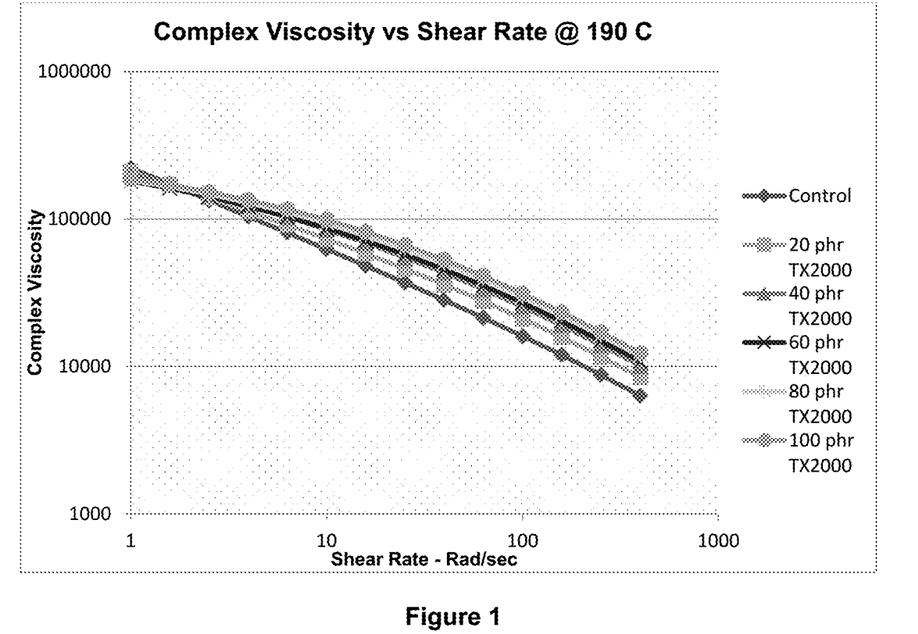
FIG. 1 illustrates that as the shear rate increases, the decrease in viscosity is the same for the PVC control and for samples that contain up to 100 phr of copolyester.
Figure 2:
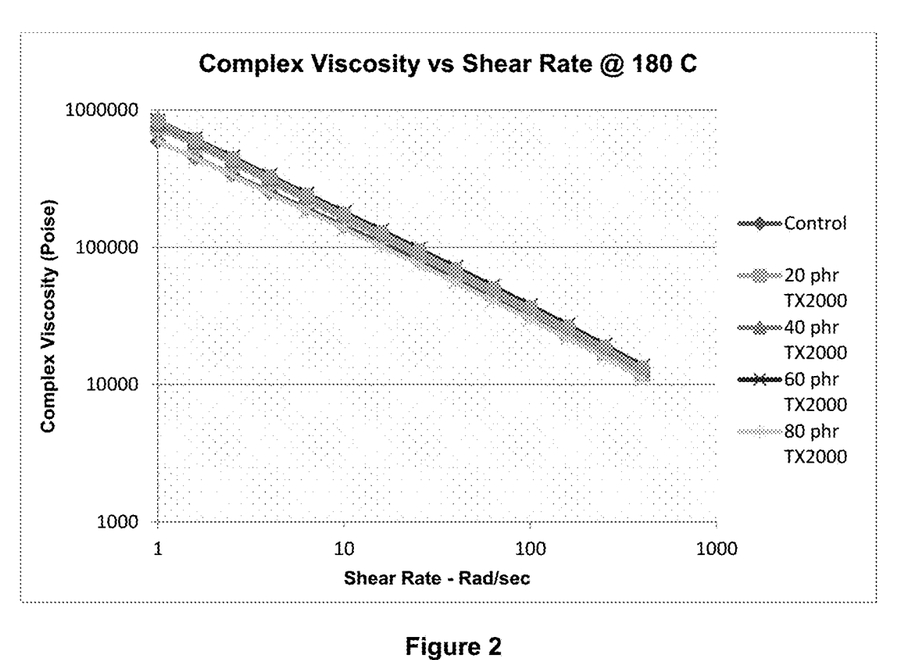
FIG. 2 illustrates that as the shear rate increases, the decrease in viscosity is the same for the PVC control and for samples that contain up to 100 phr of copolyester.

Samples were prepared adding Eastman Tritan™ TX2000 at 20, 40, 60, 80 and 100 phr. FIGS. 1 and 2 illustrates the

TABLE 4

Tensile Properties (ASTM D-638), TX2000 and Telalloy ™ A15X

| | | MACHINE DIRECTION | | | | | TRANSVERSE DIRECTION | | | | |
|---|---|---|---|---|---|---|---|---|---|---|---|
| Notebook # (EX726-032- HDT-) | Compositions | Yield Stress MPa | Yield Strain % | Break Stress MPa | Break Strain % | Youngs Modulus MPa | Yield Stress MPa | Yield Strain % | Break Stress MPa | Break Strain % | Youngs Modulus MPa |
| 1 | Control | 43.4 | 6.0 | 48.3 | 258.0 | 1561.3 | 42.2 | 5.7 | 40.0 | 197.5 | 1567.9 |
| 2 | 20 PHR TX2000 | 42.8 | 6.7 | 47.3 | 215.7 | 1461.4 | 42.1 | 6.3 | 39.3 | 152.8 | 1466.7 |
| 3 | 40 PHR TX2000 | 42.9 | 7.3 | 45.3 | 182.1 | 1402.0 | 42.8 | 7.2 | 41.2 | 152.7 | 1382.4 |
| 4 | 60 PHR TX2000 | 41.9 | 8.0 | 46.5 | 193.9 | 1286.8 | 42.1 | 6.9 | 39.9 | 116.9 | 1366.6 |
| 5 | 80 PHR TX2000 | 43.3 | 7.7 | 52.1 | 191.6 | 1408.6 | 42.7 | 7.8 | 43.2 | 151.3 | 1378.0 |
| 6 | 100 PHR TX2000 | 42.9 | 8.2 | 46.1 | 163.7 | 1281.4 | 42.3 | 7.8 | 41.1 | 137.2 | 1313.3 |
| 12 | 20 PHR Telalloy ™ A-15X | 47.9 | 6.3 | 40.8 | 170.1 | 1631.1 | 42.4 | 5.1 | 38.8 | 13.0 | 1455.2 |
| 13 | 40 PHR Telalloy A-15X | 49.4 | 5.6 | 38.0 | 57.0 | 1597.5 | 47.1 | 5.0 | 38.6 | 20.0 | 1659.9 |
| 14 | 60 PHR Telalloy A-15X | 51.8 | 5.8 | 39.8 | 29.9 | 1602.3 | 48.7 | 5.0 | 44.2 | 11.2 | 1683.7 |

These samples were prepared using Eastman Tritan™ TX2000 at 20, 40, 60, 80 and 100 phr. Table 4 summarizes the Tensile Property data (ASTM D-638). Measurements were performed in the direction the films were pulled off the two roll mil (machine direction) and perpendicular to the viscosity data versus shear rate at 180° C. and 190° C. as determined by parallel plate rheometry. The data shows that at a typical PVC processing shear rate of around 10 Rad/Sec, the Tritan TX2000 blends have very similar melt viscosities under shear compared to the control PVC composition.

TABLE 5

Tensile Properties (ASTM-638) and Instrumented Impact (ASTM D3763), Polycarbonate blends

|  |  | Machine Direction | | | | | Transverse Direction | |
|---|---|---|---|---|---|---|---|---|
| Notebook # (EX726-032-HDT) | Compositions | Mean Yield Stress (Mpa) | Mean Yield Strain (%) | Mean Break Stress (Mpa) | Mean Break Strain (%) | Mean Youngs Modulus (Mpa) | Mean Yield Stress (Mpa) | Mean Yield Strain (%) |
| 032 | 20 PHR PC 2658 | 45.478 | 6.309 | 39.181 | 87.150 | 1710.726 | 43.450 | 5.782 |
| 033 | 40 PHR PC 2658 | 48.327 | 6.775 | 40.652 | 66.396 | 1704.889 | 45.842 | 6.039 |
| 034 | 60 PHR PC 2658 | 49.551 | 7.201 | 43.643 | 73.641 | 1664.864 | 47.654 | 6.531 |

| | Transverse Direction | | | Impact Data | | | |
|---|---|---|---|---|---|---|---|
| Notebook # (EX726-032-HDT) | Mean Break Stress (Mpa) | Mean Break Strain (%) | Mean Youngs Modulus (Mpa) | Average Max Load (kN) | Average Energy at Max Load (J) | Average Total Energy (J) | Brittle (%) |
| 032 | 35.382 | 53.395 | 1660.105 | 0.57 | 3.19 | 3.50 | 80.0 |
| 033 | 37.782 | 33.446 | 1664.970 | 0.58 | 3.16 | 3.38 | 100.0 |
| 034 | 39.790 | 32.449 | 1594.900 | 0.50 | 2.29 | 2.42 | 100.0 |

Figure 3A:
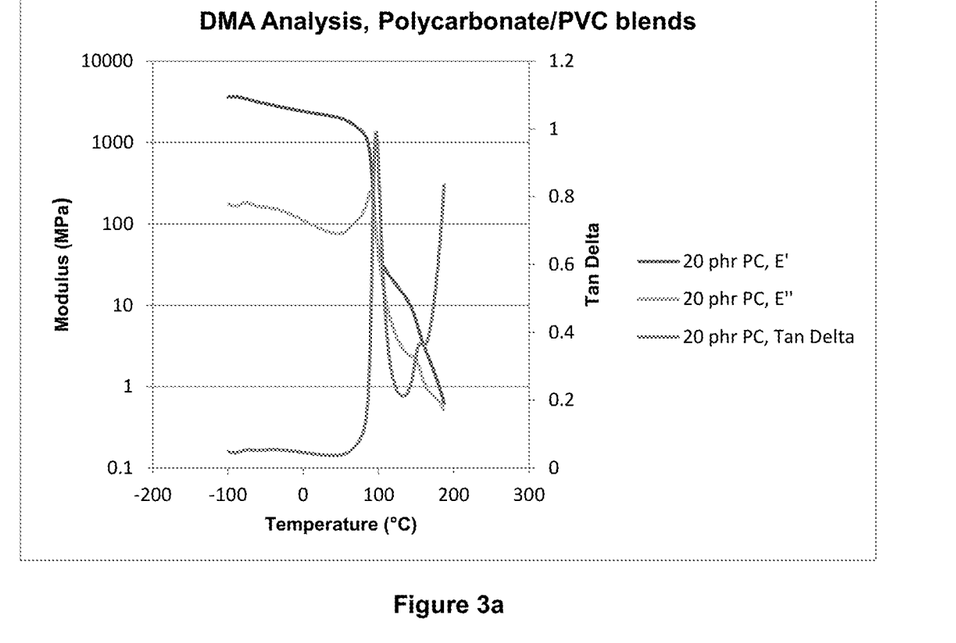
FIGS. 3a, 3b, and 3c illustrate that the PVC and the polycarbonate are immiscible and do not form a single glass transition temperature; as the amount of polycarbonate increases, two distinct glass transition temperatures are present as shown by the Tan Delta readings.
Figure 3B:
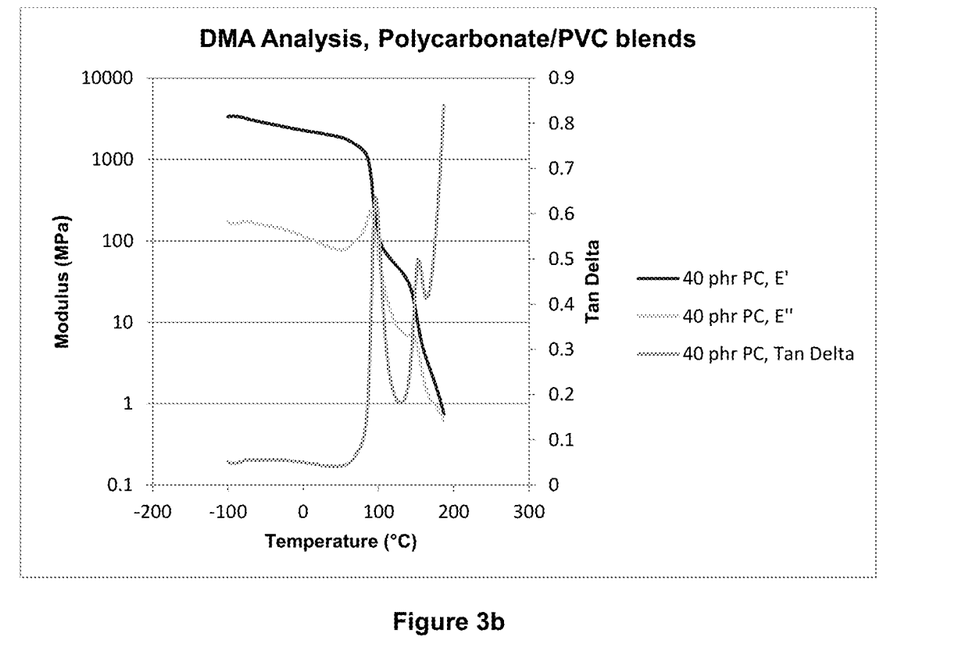
Figure 3C:
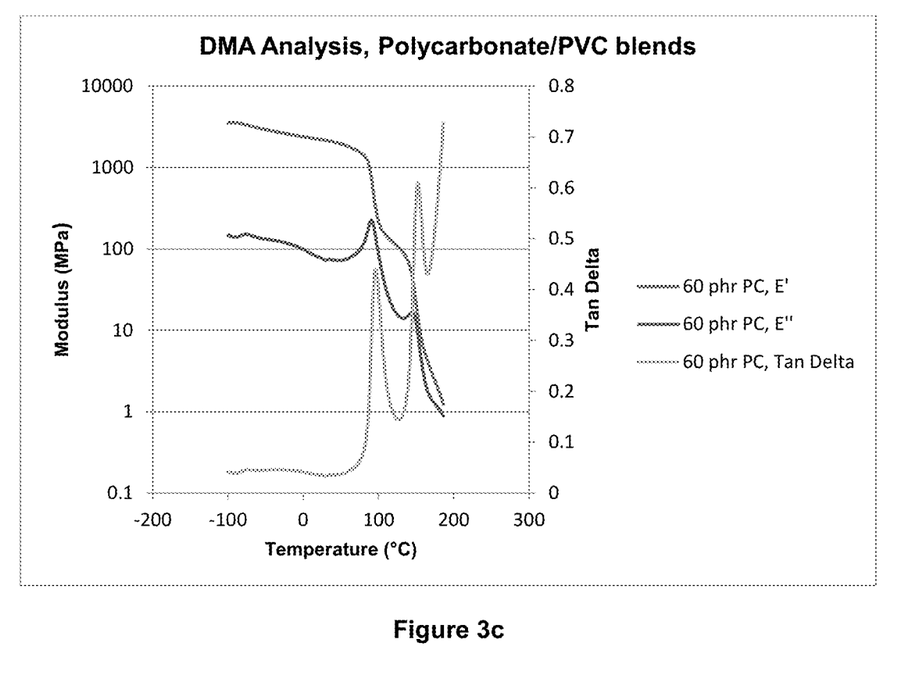

Comparative Example 5: Tensile Properties, Impact Properties and Compatibility of Polycarbonate at 20, 40 and 60 phr Samples were prepared adding Makrolon™ 2658 at 20, 40 and 60 phr. Table 5 contains tensile property data and instrumented impact data. FIG. 3 contains DMA data. Makrolon 2658 has a Tg of about 145° C. and polycarbonates are known for being very tough polymers. The data in Table 5 shows that all levels of Makrolon 2658 tested show poor impact properties by lower % strain at break and brittle instrumented impact properties. FIG. 3 shows that the blends of Makrolon 2658 and the control PVC composition are immiscible as demonstrated by two distinct Tg's as determined by the Tan Delta peaks. This data shows that merely incorporating a high Tg thermoplastic polymer into rigid PVC is not sufficient to increase the Tg and HDTUL and maintain the impact properties of the blend. The high temperature thermoplastic polymer must also be miscible and compatible.

The invention claimed is:

1. A polyvinyl chloride composition comprising a polyvinyl chloride resin and at least one copolyester which comprises:
   (a) a dicarboxylic acid component comprising:
      (i) about 90 to about 100 mole % of terephthalic acid residues;
      (ii) about 0 to about 10 mole % of aromatic and/or aliphatic dicarboxylic acid residues having up to 20 carbon atoms; and
   (b) a glycol component comprising:
      (i) about 20 to about 60 mole % of a of a first modifying glycol having 2 to 20 carbon atoms, wherein the modifying glycol is selected from the group consisting of ethylene glycol, neopentyl glycol, isosorbide, 1,4-cyclohexanedimethanol, and 2,2,4,4,-tetramethyl-1,3-cyclobutanediol; and
      (ii) about 40 to about 80 mole % of a second different modifying glycol having 2 to 20 carbon atoms, wherein the second different modifying glycol is selected from the group consisting of ethylene glycol, neopentyl glycol, isosorbide, 1,4-cyclohexanedimethanol, and 2,2,4,4,-tetramethyl-1,3-cyclobutanediol;
   wherein the total mole % of the dicarboxylic acid component is 100 mole %, and wherein the total mole % of the glycol component is 100 mole %;
   wherein the copolyester is amorphous;
   wherein the copolyester has a crystallization half time of about 5 minutes or greater;
   wherein the inherent viscosity of the copolyester is from about 0.50 to about 0.80 dL/g as determined in 60/40 (wt/wt) phenol/tetrachloroethane at a concentration of 0.25 g/50 ml at 25° C.;
   wherein the Tg of the copolyester is at least about 90° C. or higher;
   wherein the ratio of polyvinyl chloride resin:copolyester on a weight fraction basis is greater than 1; and
   wherein said polyvinyl chloride composition comprises a miscible blend comprising said polyvinyl chloride resin and said at least one copolyester.

2. The polyvinyl chloride composition of claim 1, wherein the Tg of the copolyester is at least about 100° C. or higher.

3. The polyvinyl chloride composition of claim 1, wherein the copolyester is about 1 to about 100 parts per hundred resin (phr) based on the content of the polyvinyl chloride resin in the composition.

4. The polyvinyl chloride composition of claim 1, wherein said polyvinyl chloride resin is a polyvinyl chloride resin, a chlorinated polyvinyl chloride resin, or alloys thereof.

5. The polyvinyl chloride composition of claim 1, wherein said composition further comprising at least one of the following additives: processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, and heat distortion temperature modifiers.

6. The polyvinyl chloride composition of claim 1, wherein the copolyester has a viscosity range of about 1,000 to about 1,000,000 poise measured at about 170 to about 230° C. and at 10 1/s shear rate.

7. Films, sheets, profiles and injection molded parts comprising the polyvinyl chloride compositions of claim 1.

8. An article of manufacture comprising the polyvinyl chloride compositions of claim 1.

9. The article of claim 8, wherein the article has an increase in Tg and HDTUL (heat distortion temperature under load) of at least 3° C. compared to an article made from the polyvinyl chloride composition without the copolyester.

10. A method of producing a polyvinyl chloride composition comprising: extruding at least one polyvinyl chloride resin and at least one copolyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 60 mole % of a first modifying glycol having 2 to 20 carbon atoms, wherein the modifying glycol is selected from the group consisting of ethylene glycol, neopentyl glycol, isosorbide, 1,4-cyclohexanedimethanol, and 2,2,4,4,-tetramethyl-1,3-cyclobutanediol; and
(ii) about 40 to about 80 mole % of a second different modifying glycol having 2 to 20 carbon atoms, wherein the second different modifying glycol is selected from the group consisting of ethylene glycol, neopentyl glycol, isosorbide, 1,4-cyclohexanedimethanol, and 2,2,4,4,-tetramethyl-1,3-cyclobutanediol;
wherein the total mole % of the dicarboxylic acid component is 100 mole %, and wherein the total mole % of the glycol component is 100 mole %, to produce a viscous blend of thermoplastic material;
introducing the blend of thermoplastic material into a calendering, extrusion or injection molding process to produce polyvinyl chloride articles;
wherein the copolyester is amorphous;
wherein the copolyester has a crystallization half time of about 5 minutes or greater;
wherein the inherent viscosity of the copolyester is from about 0.50 to about 0.80 dL/g as determined in 60/40 (wt/wt) phenol/tetrachloroethane at a concentration of 0.25 g/50 ml at 25° C.;
wherein the Tg of the copolyester is at least about 90° C. or higher;
wherein the ratio of polyvinyl chloride resin:copolyester on a weight fraction basis is greater than 1;
wherein said blend of thermoplastic material is a miscible blend comprising said at least one polyvinyl chloride resin and at least one copolyester; and
wherein the articles have an increase in Tg and HDTUL (heat distortion temperature under load) of at least 3° C. compared to an article made from the polyvinyl chloride composition without the copolyester.

11. A method of producing a polyvinyl chloride composition comprising: compounding a miscible admixture of at least one polyvinyl chloride resin and at least one copolyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 60 mole % of a first modifying glycol having 2 to 20 carbon atoms, wherein the modifying glycol is selected from the group consisting of ethylene glycol, neopentyl glycol, isosorbide, 1,4-cyclohexanedimethanol, and 2,2,4,4,-tetramethyl-1,3-cyclobutanediol; and
(ii) about 40 to about 80 mole % of a second different modifying glycol having 2 to 20 carbon atoms, wherein the second different modifying glycol is selected from the group consisting of ethylene glycol, neopentyl glycol, isosorbide, 1,4-cyclohexanedimethanol, and 2,2,4,4,-tetramethyl-1,3-cyclobutanediol;
wherein the total mole % of the dicarboxylic acid component is 100 mole %, and wherein the total mole % of the glycol component is 100 mole %, to produce a viscous thermoplastic material;
extruding the compound through a die to produce pellets; and
introducing the pellets into a calendering, extrusion or injection molding process to produce polyvinyl chloride articles;
wherein the copolyester is amorphous;
wherein the copolyester has a crystallization half time of about 5 minutes or greater;
wherein the inherent viscosity of the copolyester is from about 0.50 to about 0.80 dL/g as determined in 60/40 (wt/wt) phenol/tetrachloroethane at a concentration of 0.25 g/50 ml at 25° C.;
wherein the Tg of the copolyester is at least about 90° C. or higher;
wherein the ratio of polyvinyl chloride resin:copolyester on a weight fraction basis is greater than 1; and
wherein the articles have an increase in Tg and HDTUL (heat distortion temperature under load) of at least 3° C. compared to an article made from the polyvinyl chloride composition without the copolyester.

12. The polyvinyl chloride articles of claim 10 or 11, wherein the articles are used in the following applications: building and construction, corner profiles, decking, fencing, railings, soffits, vinyl siding, cladding, window profiles, door frames, siding, fences, gutters, pipes, piping appliances; electrical and electronic enclosures, electrical junction boxes, automobile interiors and exteriors, appliances, office equipment or medical devices sign enclosures, office equipment, medical devices, and aircraft interiors.

13. The polyvinyl chloride composition of claim 10 or 11, wherein said polyvinyl chloride resin composition further comprising at least one of the following additives: processing aids, plasticizers, stabilizers, impact modifiers, biocides, flame retardants, foaming agents, blowing agents, thermal stabilizers, UV stabilizers, UV absorbers, minerals, pigments, dyes, colorants, fillers, fibers, waxes, fusion promoters, antioxidants, antistatic agents, release agents, lubricants, additional resins, and heat distortion temperature modifiers.

14. The polyvinyl chloride composition of claim 10 or 11, wherein said polyvinyl chloride resin is a polyvinyl chloride resin, chlorinated polyvinyl chloride resin, or alloys thereof.

15. The method of claim 10 or 11, wherein said polyvinyl chloride resin composition is rigid.

16. The method of claim 10 or 11, wherein the Tg of the copolyester is at least about 100° C. or higher.

17. The method of claim 10 or 11, wherein the copolyester is about 1 to about 100 parts per hundred resin (phr) based on the PVC resin content in the composition.

18. The method of claim 10 or 11, wherein the articles are used in the following applications: building and construction, corner profiles, decking, fencing, railings, soffits, vinyl siding, cladding, window profiles, door frames, siding, fences, gutters, pipes, piping, electrical and electronic enclosures, electrical junction boxes, automobile interiors and exteriors, appliances, office equipment, sign enclosures, medical devices, aircraft interiors, and other applications.

19. The polyvinyl chloride articles made using the method of claim 10 or 11 have a Tg up to 110° C. or a HDTUL of up to 130° C.

\* \* \* \* \*